(No Model.)

C. H. MALLORY.
TOOL FOR GRINDING REAPER CUTTERS.

No. 407,023. Patented July 16, 1889.

Witness,
Geo. W. Learman
Geo. B. Tibbitts

Inventor,
Charles H. Mallory.
By his Attorney Geo. W. Tibbitts ately as specified above.

UNITED STATES PATENT OFFICE.

CHARLES H. MALLORY, OF SPRINGBOROUGH, PENNSYLVANIA.

TOOL FOR GRINDING REAPER-CUTTERS.

SPECIFICATION forming part of Letters Patent No. 407,023, dated July 16, 1889.

Application filed February 23, 1889. Serial No. 300,960. (No model.)

*To all whom it may concern:*

Be it known that I, CHARLES H. MALLORY, a citizen of the United States, residing at Springborough, in the county of Crawford and State of Pennsylvania, have invented a new and useful Tool for Sharpening Reaper and Mower Cutting Knives and Sections, of which the following is a specification.

This invention relates to a device for grinding and sharpening the cutting-sections on the finger-bars and the cutting-knives of reaper and mowing machines, and has for its object to greatly facilitate and expedite the work by enabling the operator to use the implement in the field without having to remove the parts of the machine for the purpose.

My invention consists in the peculiar construction and adaptation of the parts of my device, substantially as hereinafter described, pointed out in the claim, and illustrated in the accompanying drawings, in which—

Figure 2:
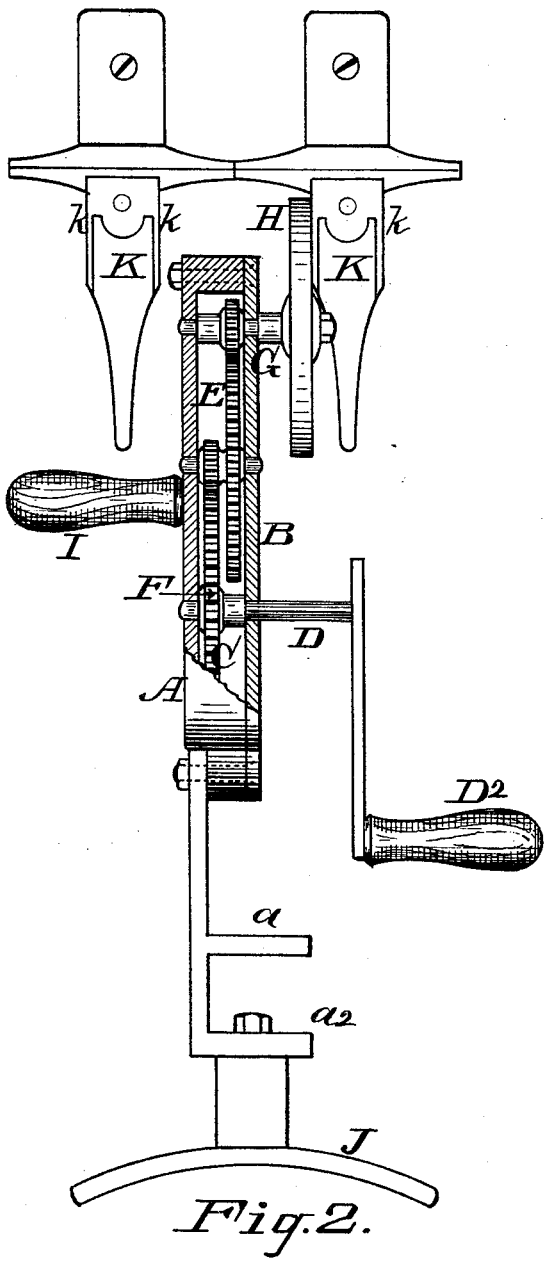
Figure 1:
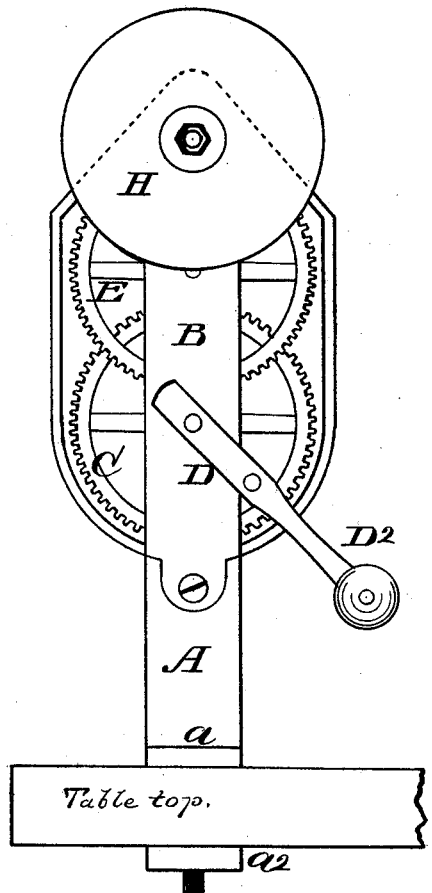

Figure 1 is a side elevation, and Fig. 2 is an edge elevation, partly in section, of my grinding implement.

A is a plate having a box formed on one part for supporting the operating parts, the other end extended and forming a handle or arm. The forward end of said box is pointed and the other end is made round, as shown in Fig. 1.

B is a narrow plate secured at both ends to the point and the heel of the box by bolts.

C is a gear-wheel located in the rounded heel of the box and is fixed on a crank-shaft D, having its bearings in the box-plate A and plate B.

E is a second gear-wheel fixed on a short shaft $e$, also having its bearing in the plates A and B, and also has a pinion F, meshing with the gear C.

G is a third shaft having its bearing in the plates A and B near the point of the box, and is provided with a pinion $g$, meshing with the gear E. The shaft G extends through the plate B and carries an emery grinding-wheel H.

I is a handle fixed to the plate A, by which the device may be held in the left hand of the operator, the right hand being used to turn the crank $D^2$.

J is a breast-piece attached to the end arm by a nut and bolt to an ear or lug $a$.

$a^2$ is a second ear or lug provided for a use hereinafter explained.

The method of using this implement is as follows:

K K K represent three finger-sections of a reaper and mower cutter-bar, the cutting-edges $k\ k$ of which require sharpening. The operator holds the implement by the handle I in his left hand, and with the breast-piece J against his body, and with the emery-wheel H by the side of the piece to be ground, at the same time turning the crank $D^2$ with his right hand, and in this manner he quickly and easily accomplishes the work. The implement is carried from one part to another, and may be held in convenient positions for sharpening the different parts of the cutting apparatus of a reaping-machine.

By fixing my implement to a work bench or table by means of the clamp consisting of the two ears or lugs $a$ and $a^2$ and a set-screw S the implement may be used as a saw-gummer.

Having described my invention, I claim—

The combination, with the grinding-tool consisting of the two plates A and B, having the handle I and carrying the gears C E, having their shafts journaled in said plates, shaft D, provided with crank-handle $D^2$, and shaft G, carrying grinding-wheel H, of the lugs $a\ a^2$, formed on the end of plate A, and the removable breast-piece J, attached to lug $a$, all constructed and arranged to operate substantially as specified.

CHARLES H. MALLORY.

Witnesses:
 MARY THORNTON,
 FRANK E. BEST.